United States Patent [19]
Schutt

[11] 3,957,675
[45] May 18, 1976

[54] ULTRAVIOLET LIGHT REFLECTIVE COATING

[75] Inventor: John B. Schutt, Silver Spring, Md.

[73] Assignee: The United States of America as represented by the United States National Aeronautics and Space Administration, Washington, D.C.

[22] Filed: Sept. 28, 1973

[21] Appl. No.: 401,919

[52] U.S. Cl................ 252/300; 106/306; 250/372; 350/1
[51] Int. Cl.² ............... H01Q 15/14; G02B 5/26
[58] Field of Search .............. 252/300, 8.5 B; 106/306; 250/372; 350/1

[56] References Cited
UNITED STATES PATENTS 3,512,895   5/1970   Grum et al................ 250/228
3,654,164   4/1972   Sperry................... 252/8.5 B OTHER PUBLICATIONS
Chem. Abs. Vol. 63 (1965) No. 1567e.

Primary Examiner—Leland A. Sebastian
Assistant Examiner—Deborah L. Kyle
Attorney, Agent, or Firm—Robert F. Kempf; John R. Manning; Ronald F. Sandler

[57] ABSTRACT

An ultraviolet light reflective coating is disclosed which exhibits high reflectance to ultraviolet light having wavelengths down to about 2,000 Angstrom units. The coating composition comprises a dispersion of barium sulphate in an aqueous solution of a water-soluble inorganic binder selected from the group consisting of alkali metal sulphates, ammonium sulphate and mixtures thereof. The coating is preferably employed in conjunction with an alkaline primer.

7 Claims, 1 Drawing Figure

UV REFLECTANCES OF BARIUM SULPHATE COATINGS EMPLOYING VARIOUS BINDERS

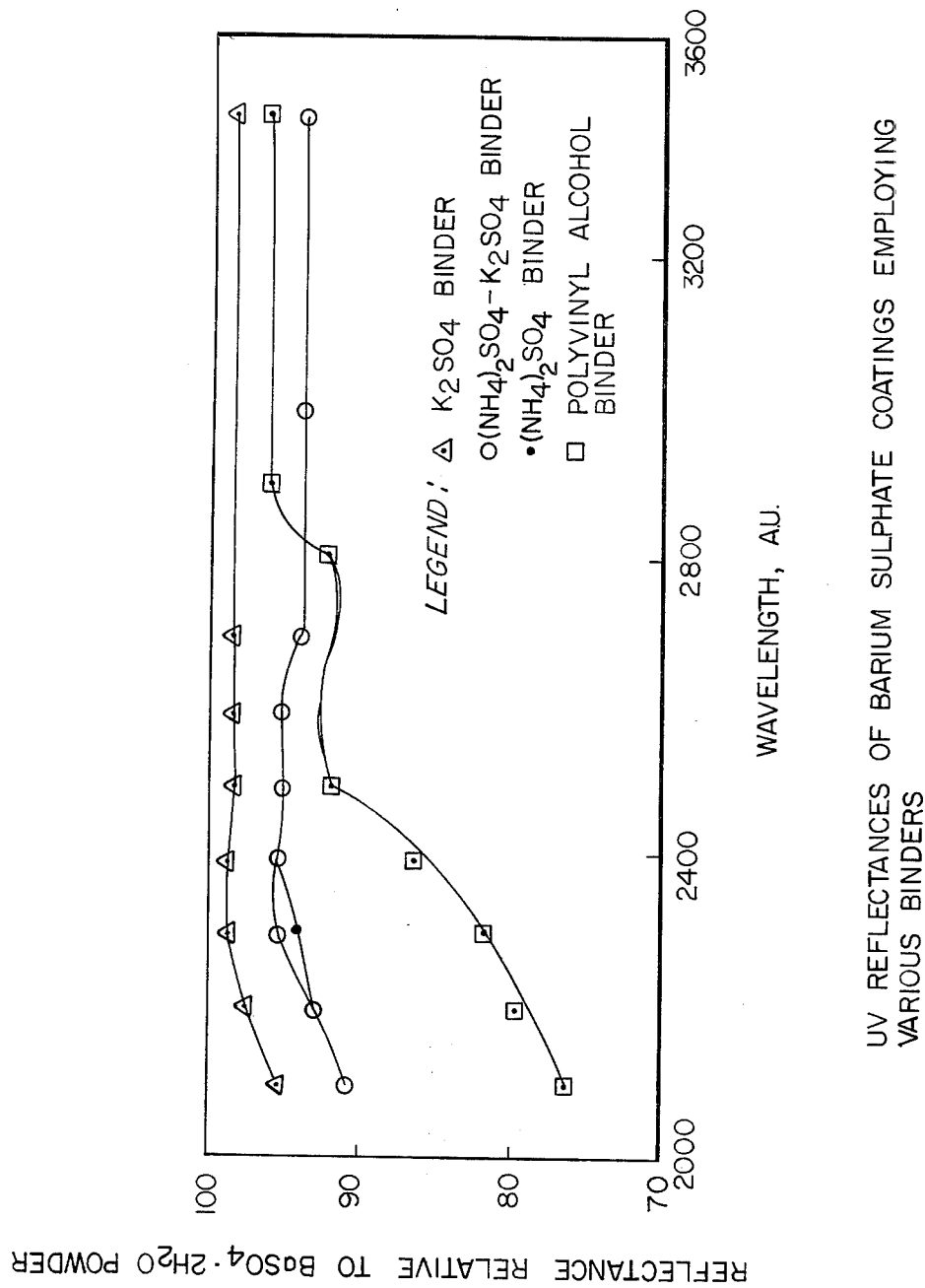
UV REFLECTANCES OF BARIUM SULPHATE COATINGS EMPLOYING VARIOUS BINDERS

ULTRAVIOLET LIGHT REFLECTIVE COATING

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention generally relates to ultraviolet light reflective coatings and particularly concerns such coatings containing barium sulphate and allowing the intrinsically high reflectance of this material in the near vacuum ultraviolet to be optimally employed.

Barium suphate is known to have intrinsically high reflectance over the entire spectrum of ultraviolet light, i.e., within the range of wavelengths between 2,000 and 4,000 Angstrom units (A.U.). For this reason, barium sulphate is frequently employed as a pigment in ultraviolet light reflective coatings. Heretofore, such coatings have typically employed as a binder for the barium sulphate, various organic binders such as polyvinyl alcohol, polyvinyl acetate, polyvinyl isobutyl ether, ethyl cellulose, nitro cellulose, linseed oil alkyd and the like. These organic binders provide coatings which are highly reflective to ultraviolet light having wavelengths down to about 2,900 A.U., below which point the reflectance of these coatings begins to fall off and becomes rather low in comparison with the intrinsic reflectance of the virgin barium sulphate powder as the wavelength of light approaches 2,000 A.U. For most applications, this does not present too serious a problem since less than 4 percent of the solar energy is summed below the wavelength of 2,900 A.U.

For some unusual applications, however, the relatively low ultraviolet reflectance of the prior art barium sulphate coatings in the near vacuum ultraviolet is undesirable. Such an application involves the collection efficiency of a coating covering the internal surfaces of a chamber designed to detect Cerenkov radiation. To perform this function most efficiently, a coating, aside from reflecting electromagnetic energy dominantly in the diffuse mode, must possess the highest possible reflectance over that range of wavelengths of greatest interest for nucler charge detection. This range happens to include energy from 2,000 to 5,000 A.U. Hence, to meet the requirement of high reflectance in the neighborhood of 2,000 A.U., the prior art barium sulphate coatings which do not approach the intrinsic reflectance of the virgin barium sulphate powder in this region, are not satisfactory.

BRIEF SUMMARY OF THE INVENTION

The instant invention has as it primary objective the provision of an ultraviolet light reflective coating which employs barium sulphate as a pigment and which allows the intrinsically high reflectance of barium sulphate in the near vacuum ultraviolet to be optimally employed so that the coating exhibits high reflectance to ultraviolet light having wavelengths down to about 2,000 Angstrum units.

This significant objective as well as others which will become apparent as the description proceeds are attained by means of the present invention by providing a coating composition comprising a dispersion of barium sulphate in an aqueous solution of a water-soluble inorganic binder selected from the group consisting of alkali metal sulphates, ammonium sulphate and mixtures thereof. When a layer of the above composition is applied to a suitable substrate and after evaporation of the vaporizable components therefrom, the resulting coating exhibits high reflectance to ultraviolet light having wavelengths down to about 2,000 Angstrum units. The coating composition of the present invention has an acidic pH and, consequently, particularly when applied to a metal substrate, is preferably employed in conjunction with an alkaline primer system to avoid corrosion of the substrate surface. Moreover, by proper selection of the alkaline primer system so as to provide a common ion effect between the reflectance coating and the primer system, additional mechanical properties are acquired by the reflectance coating from the primer syste.

DETAILED DESCRIPTION OF THE INVENTION

The reflective coating compositions in accordance with the present invention employ as a binder for the barium sulphate pigment, a water-soluble inorganic binder selected from the group consisting of alkali metal sulphates, such as potassium sulphate, sodium sulphate or lithium sulphate, ammonium sulphate, and mixtures of any of the above. The preferred binder material is potassium sulphate since it has been found that this binder provides a coating having the greatest ultraviolet reflectance. Moreover, since the ionic radius of the potassium ion so closely resembles that of both the barium ion and the sulphate ion, potassium sulphate provides a more effective binding action than the other water-soluble sulphates within the scope of the present invention.

The proportions of the ingredients employed in the reflective coating compositions of the present invention may vary over a relatively wide range, although it is generally preferred that these compositions contain from about 30 to about 40 percent by weight of barium sulphate and from about 55 to about 65 percent by weight of water; the balance of the composition being the binder material. The binder should be employed in amounts sufficient to provide the final coating with an effective binding action without unduly detracting from the intrinsic ultraviolet reflectance of barium sulphate. Moreover, the binder is preferably completely dissolved in the coating composition so that upon evaporation of the aqueous solvent-dispersant the binder salt will more uniformly crystallize in the interstices between the barium sulphate particles giving a more effective binding action. Due to varying solubilities, the amount of binder present in the coating composition is somewhat dependent upon the particular sulphate salt used as the binder. In the case of the alkali metal sulphates, optimum results are obtained when the binder is employed in amounts providing a saturated solution of the alkali metal sulphate in the coating composition, although lesser amounts may suitably be used. In the case of ammonium sulphate, which is more highly soluble in water than the alkali metal sulphates, the binder is preferably employed in a weight ratio of ammonium sulphate to barium sulphate within the range of from about 1:3 to about 1:12, although lesser amounts may suitably be employed particularly when the ammonium sulphate is used in admixture with an alkali metal sulphate. The optimum weight ratio of ammonium sulphate to barium sulphate has been found to be about

1:6.

The reflective coating compositions of the present invention are suitably prepared by adding the soluble sulphate binder to the required amount of water and stirring until a solution is obtained. Thereafter, the barium sulphate is added slowly and stirred until the composition is agglomerate free.

The reflective coating compositions in accordance with the present invention have an acidic pH. Consequently, in order to prevent corrosive action by these coatings on the commonly used metal substrates, it is highly desirable to employ the reflective coatings in conjunction with an alkaline primer. Although any alkaline primer system could suitably be used, it is preferred to employ an aluminum oxide primer since aluminum oxide has a relatively high reflectivity to light over the region of interest and therefore requires the use of a less thick top coating in order to obtain the desired results. A particularly suitable primer composition comprises a dispersion of aluminum oxide in an aqueous solution of an alkali metal silicate, such as potassium silicate, sodium silicate or lithium silicate. Typical primers of this type contain, for example, from about 4 to about 15 percent by weight of the alkali metal silicate, from about 25 to about 45 percent by weight of aluminum oxide and from about 35 to about 60 percent by weight of water. The alkali metal silicate is preferably selected so as to take advantage of the common ion effect with the binder of the reflective coating so as to provide the reflective coating with additional mechanical properties. For example, when the preferred binder, potassium sulphate, is used in the reflective coating, the alkali metal silicate in the primer will preferably be potassium silicate.

Using as an example the preferred system, i.e., where the binder in the reflective coating is potassium sulphate and the primer comprises aluminum oxide and potassium silicate, the chemical mechanism by which the relfective coating acquires additional mechanical properties from the primer may be explained as follows. In such a case, the reflective coating will have a pH of about 4.7 and the primer will have a pH of about 12. The composite acid-base system comprises a rather complex system of potassium salts of barium sulphate, silicic acid and to a lesser extent aluminum oxide. Since the primer is water sensitive, application thereon of the reflective coating with its lower pH causes the silicic acid and aluminum oxide potassium salts to discharge by releasing potassium ions in exchange for protons. By the common ion effect then, it follows that potassium sulphate will deionize and precipitate in the interstices of both coatings as well as in additional amounts on to barium sulphate. Hence, the alkalinity of the prime coat serves to prevent the growth of potassium sulphate crystals, which, with the common ion effects derived from sulphate as an intracoating effect and potassium as an intercoating effect, serves to give enhanced binding to the barium sulphate powder.

The reflective coating compositions of the present invention may be applied, preferably over an alkaline primer as discussed above, to a wide variety of suitable substrates including, for example, epoxy-fiberglass laminates and various metals such as aluminum, iron or steel. Application of the coating is preferably carried out while the coating composition is in its freshly prepared state, i.e., before equilibrium is established, since otherwise the pH of the composition will drop too far for the primer to be effective. The coating composition is preferably applied by spraying in one application if possible until a dry thickness of from about 8 to about 30 mils is obtained depending upon application. For efficient ultraviolet scattering a nominal thickness of 8 mils is more than sufficient; however, for a reflectance maximum through to 24,000 A.U. thickness to 30 mils may be required. Curing of the coatings to evaporate the vaporizable components therefrom and effect a good adhesive bond with the substrate may be carried out at room temperature or at elevated temperatures up to about 100°C, with curing times ranging from about 24 hours at room temperature to about 1 hour at 100°C.

The resulting coatings exhibit a high reflectance to ultraviolet light having wavelengths down to about 2,000 A.U., such reflectance comparing favorably with the virgin barium sulphate powder. Moreover, these coatings have exceptionally good ageing characteristics as measured by reflectance changes in the ultraviolet, maintaining their high reflectance for many months without turning yellow.

The following examples are given as illustrative of the instant inventive concepts. In the examples, all parts and percentages are by weight unless otherwise indicated.

EXAMPLE 1

A primer coating composition was prepared by adding 105 parts of aluminum oxide and 153 parts of water to 100 parts of a potassium silicate solution containing 65 percent water and 35 percent potassium silicate solids having 3.3 moles of silicon dioxide per mole of potassium oxide. The resulting mixture was then charged into a jar mill and milled for 1 hour. The milled slurry was then applied to an aluminum substrate by spraying until a dry thickness of about 8 mils was obtained (about 16 mils wet), and was allowed to air cure at least 24 hours before top coating. Air cure over a period of several hours is required to enable a good adhesive bond to develop between the primer and substrate.

EXAMPLE 2

The procedure of Example 1 was repeated, employing 115.5 parts of aluminum oxide, 166 parts of water and 100 parts of potassium silicate solution containing 65 percent water and 35 percent potassium silicate having 3.3 moles of silicon dioxide per mole of potassium oxide.

EXAMPLE 3

A reflective coating composition was prepared by adding 1.014 parts of potassium sulphate to 108 parts of water and stirring until a solution was obtained. The resulting solution was a saturated solution of potassium sulphate. Seventy-two parts of barium sulphate were then added slowly to the solution and stirred until the composition was agglomerate free. The resulting coating composition was then applied to a primed aluminum substrate prepared in accordance with Example 1, by spraying until a dry thickness of 30 mils was obtained. The coating was allowed to air cure for 24 hours. Reflectance measurements showed the resulting coating to be highly reflective to ultraviolet light having wavelengths down to about 2,000 A.U. and to maintain such reflectance for a period of at least several months.

EXAMPLE 4

The procedure of Example 3 was repeated, employing 1.014 parts of potassium sulphate, 130 parts of water, and 72 parts of barium sulphate, with similar results being obtained.

EXAMPLE 5

The procedure of Example 3 was repeated, employing 0.009 parts of potassium sulphate, 108 parts of water, and 72 parts of barium sulphate, with similar results being obtained.

EXAMPLE 6

The procedure of Example 3 was repeated, substituting ammonium sulphate for the potassium sulphate, employing 12 parts of ammonium sulphate, 108 parts of water and 72 parts of barium sulphate, and applying the coating on to the primed aluminum substrate until a dry thickness of 8 mils was obtained. The results obtained were similar to those described above.

EXAMPLE 7

The procedure of Example 6 was repeated, employing 14.4 parts of ammonium sulphate, 108 parts of water and 72 parts of barium sulphate, with similar results being obtained.

EXAMPLE 8

The procedure of Example 6 was repeated, employing 1.01 parts of ammonium sulphate, 108 parts of water and 72 parts of barium sulphate, with similar results being obtained.

EXAMPLE 9

The procedure of Example 6 was repeated, employing 1.01 parts of ammonium sulphate, 130 parts of water and 72 parts of barium sulphate, with similar results being obtained.

EXAMPLE 10

The procedure of Example 3 was repeated, substituting a mixture of potassium sulphate and ammonium sulphate for the potassium sulphate, and employing 0.009 parts of potassium sulphate, 12 parts of ammonium sulphate, 108 parts of water and 72 parts of barium sulphate, with similar results being obtained.

EXAMPLE 11

The procedure of Example 10 was repeated, employing 0.009 parts of potassium sulphate, 14.4 parts of ammonium sulphate, 108 parts of water and 72 parts of barium sulphate, with similar results being obtained.

EXAMPLE 12

The procedure of Example 10 was repeated, employing 1.01 parts of potassium sulphate, 12 parts of ammonium sulphate, 108 parts of water and 72 parts of barium sulphate, with similar results being obtained.

EXAMPLE 13

The procedure of Example 10 was repeated, employing 1.01 parts of potassium sulphate, 1 part of ammonium sulphate, 108 parts of water and 72 parts of barium sulphate, with similar results being obtained.

EXAMPLE 14

The procedure of Example 10 was repeated, employing 1.01 parts of potassium sulphate, 12 parts of ammonium sulphate, 150 parts of water and 72 parts of barium sulphate, with similar results being obtained.

The results of ultraviolet reflectance measurements of representative coatings in accordance with the present invention are shown in graphical form in the annexed drawing. The drawing shows ultraviolet reflectance relative to barium sulphate powder of barium sulphate coatings employing various binders over a range of wavelengths between 2,000 and 3,600 A.U. The coating employing the potassium sulphate binder is that of Example 3, the coating employing the ammonium sulphate binder is that of Example 6, and the coating employing the mixed ammonium sulphate-potassium sulphate binder is that of Example 10. For purposes of comparison, reflectance measurements are also shown for a barium sulphate coating employing as a binder polyvinyl alcohol, which is representative of the organic binders employed in the prior art. The polyvinyl alcohol coating composition contained 55.2 percent by weight of barium sulphate, 0.4 percent by weight of polyvinyl alcohol, 27.2 percent by weight of water, and 17.2 percent by weight of ethyl alcohol.

As can be seen from the drawing, the barium sulphate coatings employing the inorganic binders in accordance with the present invention exhibited high reflectance to ultraviolet light throughout the entire range of wavelengths shown, with reflectance values of 90% or greater of the intrinsic reflectance of barium sulphate powder down to a wavelength of about 2,000 A.U. On the other hand, the ultraviolet reflectance of the barium sulphate coating employing the polyvinyl alcohol binder was high down to a wavelength of about 2,900 A.U., but began to drop below this point, falling to a reflectance value of approximately 75 percent of the intrinsic relfectance of barium sulphate powder in the neighborhood of 2,000 A.U.

The reflective coatings in accordance with the present invention are highly reflective to light over the entire range of wavelengths of from about 2,000 to about 24,000 A.U. and are particularly useful in coating parts of optical measuring instruments. For example, they may be used in coating the sphere of optical measuring instruments where integrated reflectance measurements are made or may be used in coating diffuser plates in optical measuring instruments where light is diffusely reflected into a detector. Their exceptionally high reflectance to ultraviolet light having wavelengths down to about 2,000 A.U. makes these coatings particularly useful where sources of ultraviolet light are normally weak and in various unusual applications such as in the detection of Cerenkov radiation.

From the foregoing detailed description, it should be apparent that the objectives set forth at the outset of this specification have been successfully achieved. Moreover, while there has been shown and described present preferred embodiments of the invention, it is to be distinctly understood by those skilled in the art that the invention is not limited thereto, but may otherwise be variously embodied and practiced within the scope of the following claims. Accordingly,

What is claimed is:

1. A coating composition comprising a dispersion of barium sulphate in an aqueous solution of a water-soluble inorganic binder selected from the group consisting of alkali metal sulphates, ammonium sulphate and mixtures thereof, said coating composition containing from about 30.6 to about 39.8 percent by weight of barium sulphate and from about 55.6 to about 64.4 percent by weight of water, the balance of the composition consisting of from about 0.005 to about 11.8 percent by weight of the water-soluble inorganic binder, said composition after evaporation of the vaporizable components form a layer thereof exhibiting high reflectance to ultraviolet light having wavelengths down to about 2,000 Angstrum units.

2. The coating composition of claim 1 wherein said aqueous solution of said binder is a saturated solution of an alkali metal sulphate.

3. The coating composition of claim 2 wherein said alkali metal sulphate is potassium sulphate.

4. The coating composition of claim 1 wherein said binder is potassium sulphate.

5. The coating composition of claim 1 wherein said binder is ammonium sulphate.

6. The coating composition of claim 5 wherein the weight ratio of ammonium sulphate to barium sulphate is about 1:6.

7. The coating composition of claim 1 wherein the binder is a mixture of potassium sulphate and ammonium sulphate.

* * * * *